(No Model.)
J. RENO & M. W. WHAYNE.
FRUIT GATHERER.
No. 462,386. Patented Nov. 3, 1891.
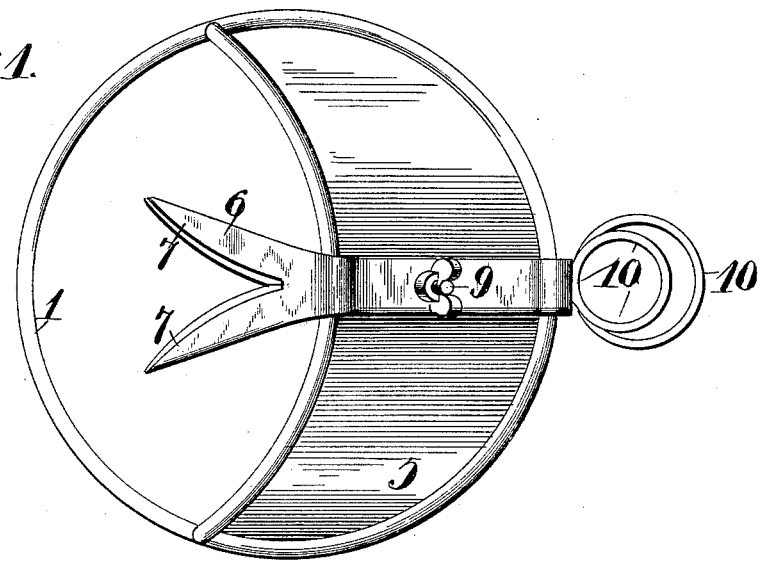
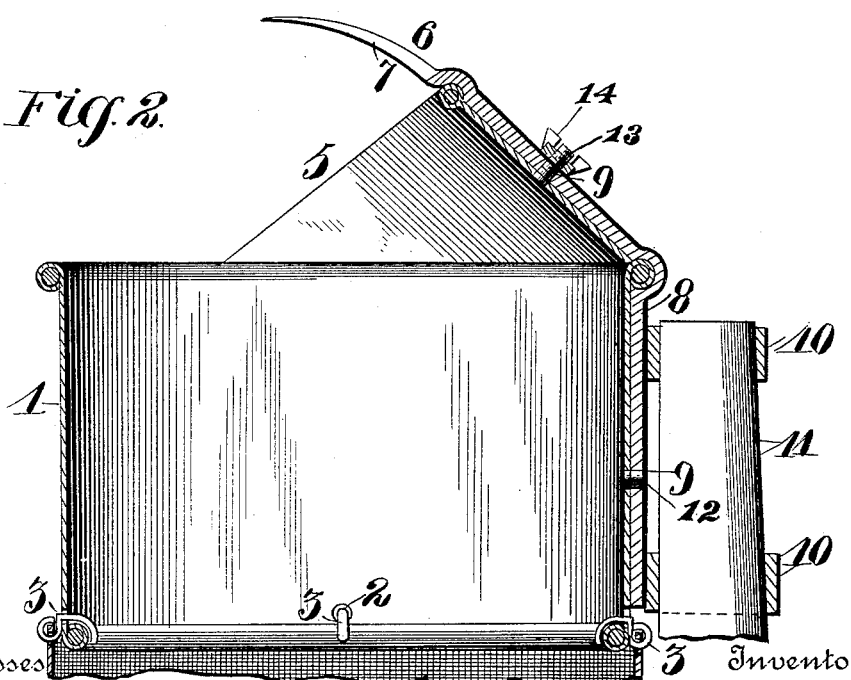

UNITED STATES PATENT OFFICE.

JOSEPH RENO, OF CIVIL BEND, MISSOURI, AND MERCER W. WHAYNE, OF EAST VIEW, KENTUCKY.

FRUIT-GATHERER.

SPECIFICATION forming part of Letters Patent No. 462,386, dated November 3, 1891.

Application filed April 25, 1891. Serial No. 390,508. (No model.)

*To all whom it may concern:*

Be it known that we, JOSEPH RENO, residing at Civil Bend, Daviess county, State of Missouri, and MERCER W. WHAYNE, residing at East View, county of Hardin, State of Kentucky, have invented certain new and useful Improvements in Fruit-Pickers, of which the following is a full, clear, and exact description, reference being had to the accopanying drawings, forming a part hereof.

Our invention relates to improvements in fruit-pickers; and it consists in the novel arrangements and combination of parts, as will be more fully hereinafter described, and designated in the claims.

In the drawings, Figure 1 is a top plan view of our complete invention, and Fig. 2 is a vertical cross-section of the same.

The object of our invention is to construct a device for picking such fruits as peaches, apples, pears, &c., without applying the hands directly to said fruit, as is the ordinary method.

With our invention the operator can stand on the ground and pick fruit from the tree.

Referring to the drawings, 1 indicates a tin cylinder or a cylinder made out of any other suitable substance. Said cylinder has both ends open, and the lower end of the same is provided with perforations 2, in which hooks 3 may be inserted, and to said hooks a sack or pouch 4 may be secured. The upper end of said cylinder is provided with a cap 5, the same covering over about half the open end of the cylinder. Said cylinder has the function of guiding and conducting the fruit that is picked into the sack or pouch 4, and also answers as a support for the fork 6, by means of which fork the fruit is plucked from the tree. Fork 6 has two prongs 7, of the construction as shown in Fig. 1, the same being bent downwardly at a gentle curve, as shown in Fig. 2, so as to fit over the exterior surface of the apple or the fruit to be picked. By the prongs 7 being bent downwardly, as described, they will not slip off of the apple when force is applied to pluck the same. The inner surfaces of said prongs are sharpened, so as to cut the stem of the fruit. Fork 6 is cast or formed integrally with an angular bar 8. Said bar is provided with perforations 9, through the lower one of which a rivet 12, secured in the cylinder 1, loosely passes, and a screw 13, secured in cap 5, passes through the upper perforation and is engaged by a thumb-nut 14. The bar 8 and its attachments are thus easily removable when desirable, in order to sharpen the fork or discharge the contents of the bag without detaching the latter from the cylinder.

10 indicates rings or bands, which are secured to or formed integrally with bar 8, and in the same the handle 11 may be inserted. We preferably use an extensible handle (which is not illustrated) for the convenience of the operator.

Having fully described the mechanical parts of our invention, we will now describe the manner of using the same. Whenever the operator desires to pick fruit he should place the fork 6 over the same and bring the sharpened edges of prongs 7 in contact with the stem of the fruit, thereby cutting the same, and the fruit will fall down in pouch or sack 4, and from thence can be removed, as desired, at the discretion of the operator.

Having fully described our invention, what we claim is—

1. In a fruit-picker, the combination, with a cylinder, of a cap covering a portion thereof, and a bar 8, having rings 10 10 thereon, detachably secured to the side of the said cylinder and top of the said cover, the upper end of the said bar being bifurcated and the bifurcations being sharpened, substantially as described.

2. In a fruit-picker, the combination, with a cylinder having eyes near the bottom thereof, of a bag having hooks adapted to pass through the said eyes, a cap covering a portion of the top of the said cylinder, a bar 8, having rings 10, detachably secured to the side of the said cylinder and top of the said cover, the upper end of the said bar being bent downwardly and bifurcated and the bifurcations being sharpened, substantially as described.

JOSEPH RENO.
MERCER W. WHAYNE.

Witnesses to the signature of Joseph Reno:
    E. E. LONGAN,
    C. F. KELLER.

Witnesses to the signature of Mercer W. Whayne:
    W. C. MONTGOMERY,
    G. A. CARPENTER.